United States Patent
Kataoka et al.

(10) Patent No.: US 7,791,868 B2
(45) Date of Patent: Sep. 7, 2010

(54) DISPLAY DEVICE

(75) Inventors: Yusuke Kataoka, Echizen (JP);
Hidenobu Mukougawa, Echizen (JP);
Tamotsu Mitamura, Echizen (JP);
Takanori Maeno, Echizen (JP);
Yoshikazu Saga, Echizen (JP)

(73) Assignee: Orion Electric Co., Ltd., Echizen (JP)

( * ) Notice: Subject to any disclaimer, the term of this patent is extended or adjusted under 35 U.S.C. 154(b) by 0 days.

(21) Appl. No.: 12/341,457

(22) Filed: Dec. 22, 2008

(65) Prior Publication Data

US 2009/0168320 A1 Jul. 2, 2009

(30) Foreign Application Priority Data

Dec. 28, 2007 (JP) .............................. 2007-339277

(51) Int. Cl.
*H05K 5/00* (2006.01)
*H05K 7/00* (2006.01)

(52) U.S. Cl. ........................ 361/679.21; 361/679.22; 361/679.26

(58) Field of Classification Search ............ 361/679.21, 361/679.22, 679.26; 349/58, 59, 60
See application file for complete search history.

(56) References Cited

U.S. PATENT DOCUMENTS 5,963,421 A 10/1999 Moss et al.
6,594,143 B2 * 7/2003 Yano et al. ............. 361/679.26
6,972,963 B1 * 12/2005 Chou ........................ 361/760
2006/0050471 A1 3/2006 Chen
2008/0111942 A1 5/2008 Lee et al.

FOREIGN PATENT DOCUMENTS

| EP | 1783583 A1 | 5/2007 |
| EP | 1793304 A2 | 6/2007 |
| EP | 2076109 A2 | 7/2009 |
| JP | 6-252567 A | 9/1994 |

OTHER PUBLICATIONS

European Search Report dated Sep. 18, 2009, issued in corresponding European Patent Application No. 08254071.7.

* cited by examiner

*Primary Examiner*—Jayprakash N Gandhi
*Assistant Examiner*—Anthony M Haughton
(74) *Attorney, Agent, or Firm*—Westerman, Hattori, Daniels & Adrian, LLP

(57) ABSTRACT

A display panel stand holding portion for supporting the display panel in the standing position is formed at the upper end portion of the back cabinet as a part of the casing of the display device. The display panel stand holding portion includes the display panel stand mount portion, and the display panel support members. This makes it possible to support the display panel vertically when it is mounted on the display panel stand mount portion. The connector cables extending from the power supply circuit board is clamped to the temporary holding portion to be formed on the back cabinet before assembly of the display panel to be inclined at the predetermined position. The deterioration in the working efficiency caused by entanglement of the connector cables may be prevented.

8 Claims, 7 Drawing Sheets

DISPLAY DEVICE

The present application is based on and claims priority of Japanese patent application No. 2007-339277 filed on Dec. 28, 2007, the entire contents of which are hereby incorporated by reference.

BACKGROUND OF THE INVENTION

1. Field of the Invention

The present invention relates to a display device with a display panel holding structure which allows easy connection between a display panel and a circuit board.

2. Description of the Related Art

Upon assembly and manufacturing of the electronic device, the terminal and the circuit board are generally connected to the other circuit board via a connector and a connector cable. Japanese Unexamined Patent Application Publication No. 6-252567 discloses the structure in which a fixing hole with a substantially convex-shape is formed in an end portion of a substantially U-like frame, and a protrusion corresponding to the fixing hole is attached to the terminal plate so as to be inserted into the fixing hole for improving the workability by simplifying the opening/closing operation of the terminal plate.

The display device using the flat display panel, for example, the liquid crystal display, the plasma display and the like which has been expanding the market share always needs the connecting process unexceptionally. For example, in the display device equipped with the display panel, the video signal and power cannot be supplied to the display panel for displaying the video image unless the circuit board for processing the video signal and the power supply board are electrically coupled with the display panel. The use of the technique disclosed in the aforementioned related art requires the special protrusion to be formed at the display panel side, and the fixing hole to be formed in the cabinet or the chassis for simplifying the connection, resulting in the increased manufacturing cost. The use of the large panel may interfere with the easy insertion of the protrusion into the fixing hole, failing to provide excellent workability.

SUMMARY OF THE INVENTION

It is an object of the present invention to provide a display device equipped with the display panel holding structure with excellent workability to allow easy connecting operation.

The display device according to one aspect of the present invention includes a display panel inside a casing formed by assembling a front cabinet having an opening with a back cabinet having an opening through engagement of the openings. The back cabinet with a rectangular shape has a pair of display panel support ribs for holding a standing position of the display panel in one of a long side direction and a short side direction.

Preferably, in the display device, the display panel support rib includes a support member for generally vertically supporting the display panel.

Preferably, in the display device, a mount portion of the display device perpendicularly extending from the back cabinet is formed adjacent to the display panel support rib.

According to the aforementioned structure, the display panel support rib formed on the back cabinet allows the display panel to stand upon connection of the display panel in the manufacturing step, or maintenance work of the display device. The standing position may be maintained by the support member. The display panel mount portion is formed to allow the display panel to be easily positioned upon assembly of the display device. The adjacently formed display panel mount portion serves to reinforce the display panel support rib.

Preferably, in the display device, an inner component is disposed at a position opposite the display panel support rib with respect to a center of the back cabinet.

Preferably, in the display device, the inner component includes at least a circuit board.

According to the aforementioned structure, the inner components which mostly occupy the weight of the display device are disposed opposite the display panel support rib of the display panel which mostly occupies the weight of the display device. This makes it possible to balance the load when standing the display panel using the display panel support rib, thus preventing the display panel from falling.

Preferably, in the display device, the display panel support rib is disposed at an upper end portion of the back cabinet and the inner component is disposed at a lower portion of the back cabinet in a concentrated manner.

According to the aforementioned structure, the display panel support rib is disposed at the upper portion of the back cabinet, and the inner components are disposed at the lower portion to balance the load applied to the back cabinet.

Preferably, in the display device, the circuit board includes a connector portion to be connected to the display panel, and a temporary holding portion for temporarily holding the connector portion is formed in an edge portion of the back cabinet.

Preferably, in the display device, the connector portion is a connector with a wire material extending from the circuit board, and the temporary holding portion is a notch which allows a portion of the wire material of the connector to be fixed.

Preferably, in the display device, the connector portion is a generally flat cable member extending from the circuit board, and the temporary holding portion is a through hole which allows insertion of the cable member.

According to the aforementioned structure, the connector with the wire material extended to the circuit board or the substantially plain-plate-like cable such as the flat cable is temporarily fixed through engagement/insertion with/into the back cabinet before connection to the display panel.

According to the aforementioned structure, the back cabinet is disposed on the flat surface of the work table such that the display panel is held in the standing position with the display panel support rib. This makes it possible to connect the circuit board to the display panel and other electronic parts, resulting in improved workability, higher manufacturing speeds, and reduced cost. As the temporary holding portion for the wire material is formed on the back cabinet, the wire material may be fixed to the temporary holding portion before assembly of the display panel. This makes it possible to prevent the wire material of the circuit board from being wound inside the back cabinet, or the wire material from being deviated from the predetermined position, resulting in the improved workability.

BRIEF DESCRIPTION OF THE DRAWINGS

Other objects, features and advantages of the present invention will become more apparent from the following detailed description made with reference to the accompanying drawings, in which.

DESCRIPTION OF THE PREFERRED EMBODIMENTS

Embodiments of the present invention will be described referring to FIGS. 1 to 7. It is to be understood that the present invention may be readily applicable to the structures other than those described in the embodiments without departing from the scope of the present invention.

First Embodiment

Figure 1:
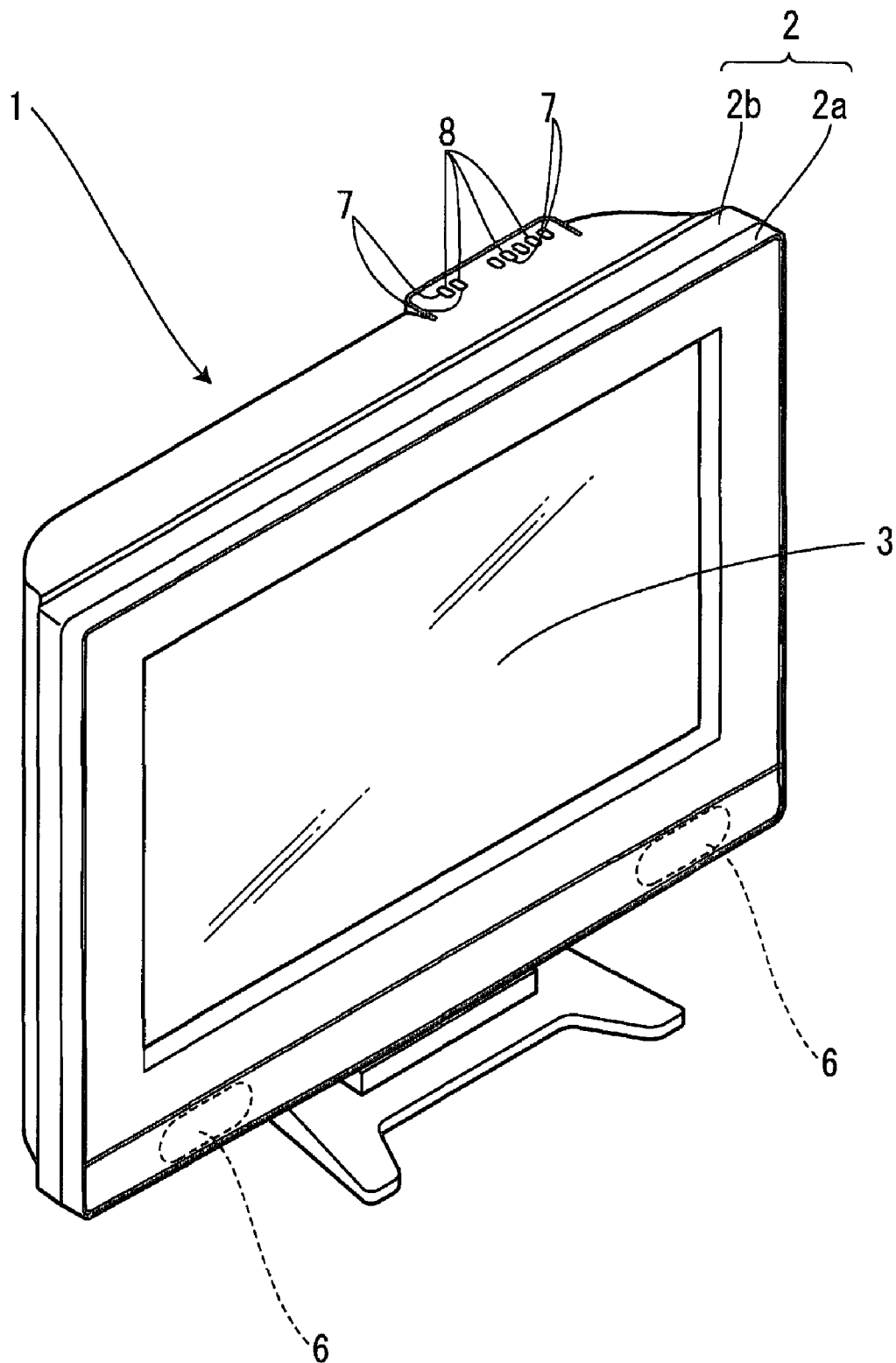
FIG. 1 is a perspective view of a liquid crystal TV receiver as the display device according to an embodiment of the present invention.
Figure 2:
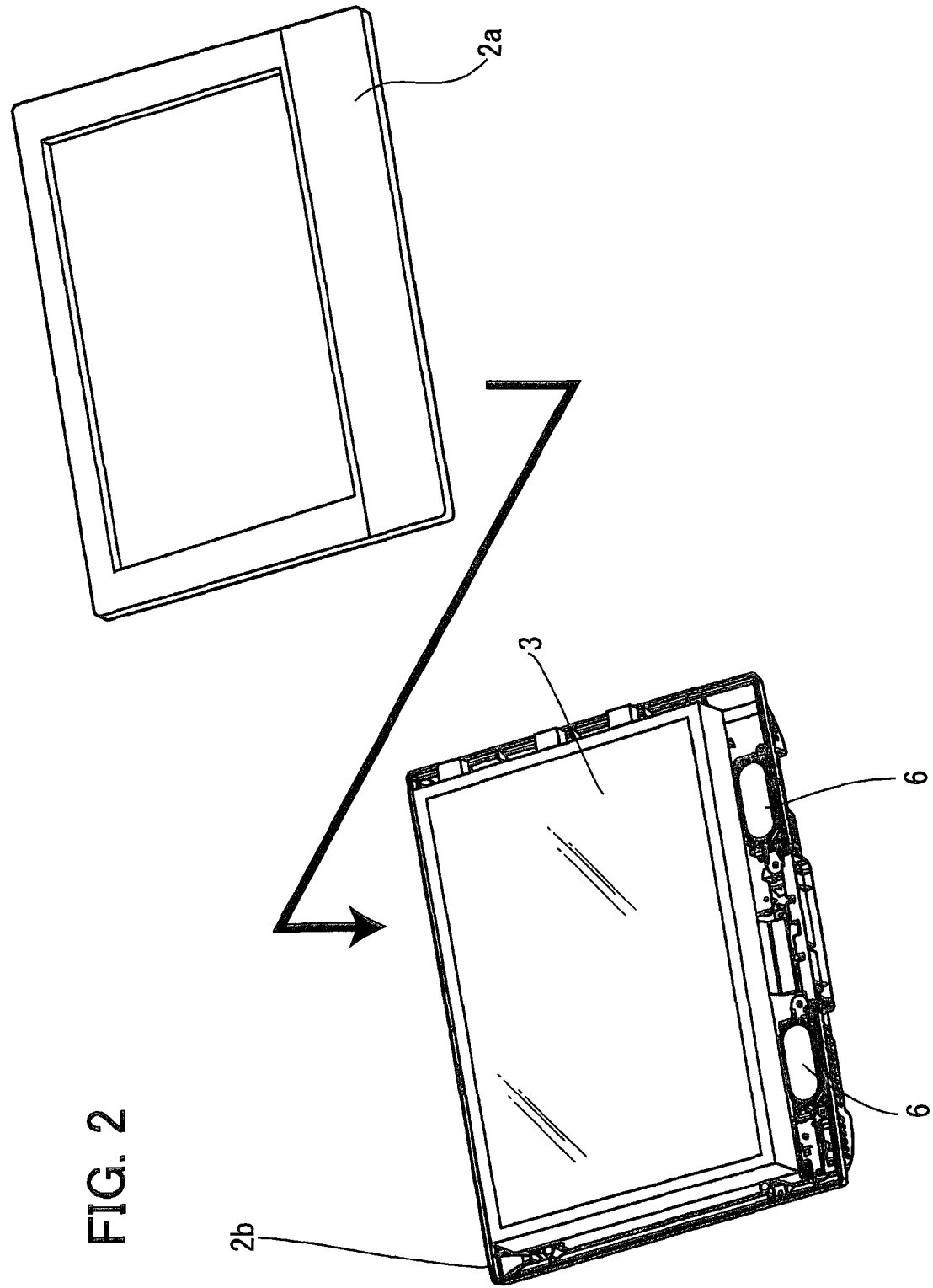
FIG. 2 is an exploded perspective view of the display device having the front cabinet removed according to the embodiment of the present invention.
Figure 3:
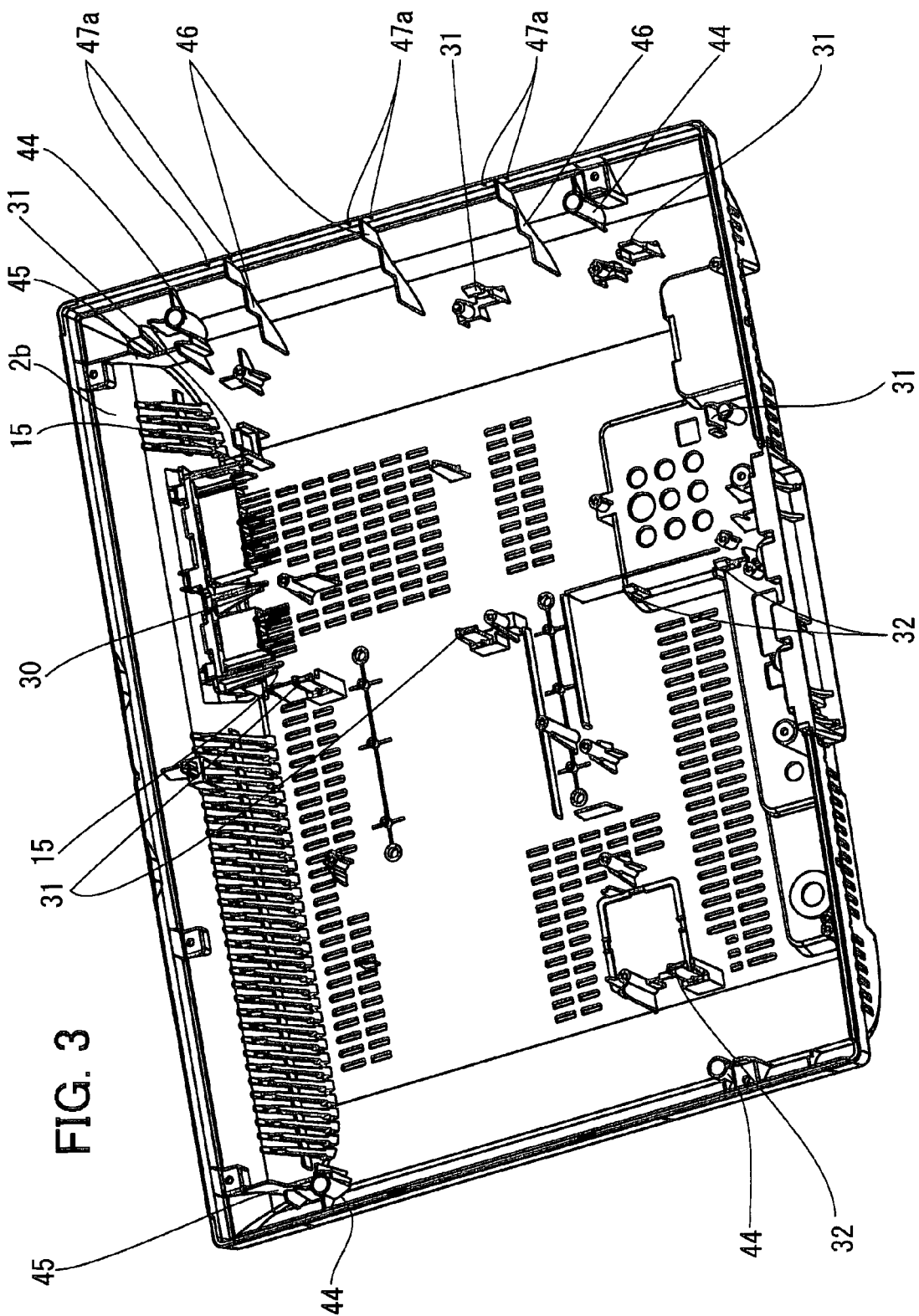
FIG. 3 is a perspective view as an overview of the back cabinet according to the embodiment of the present invention.
Figure 4:
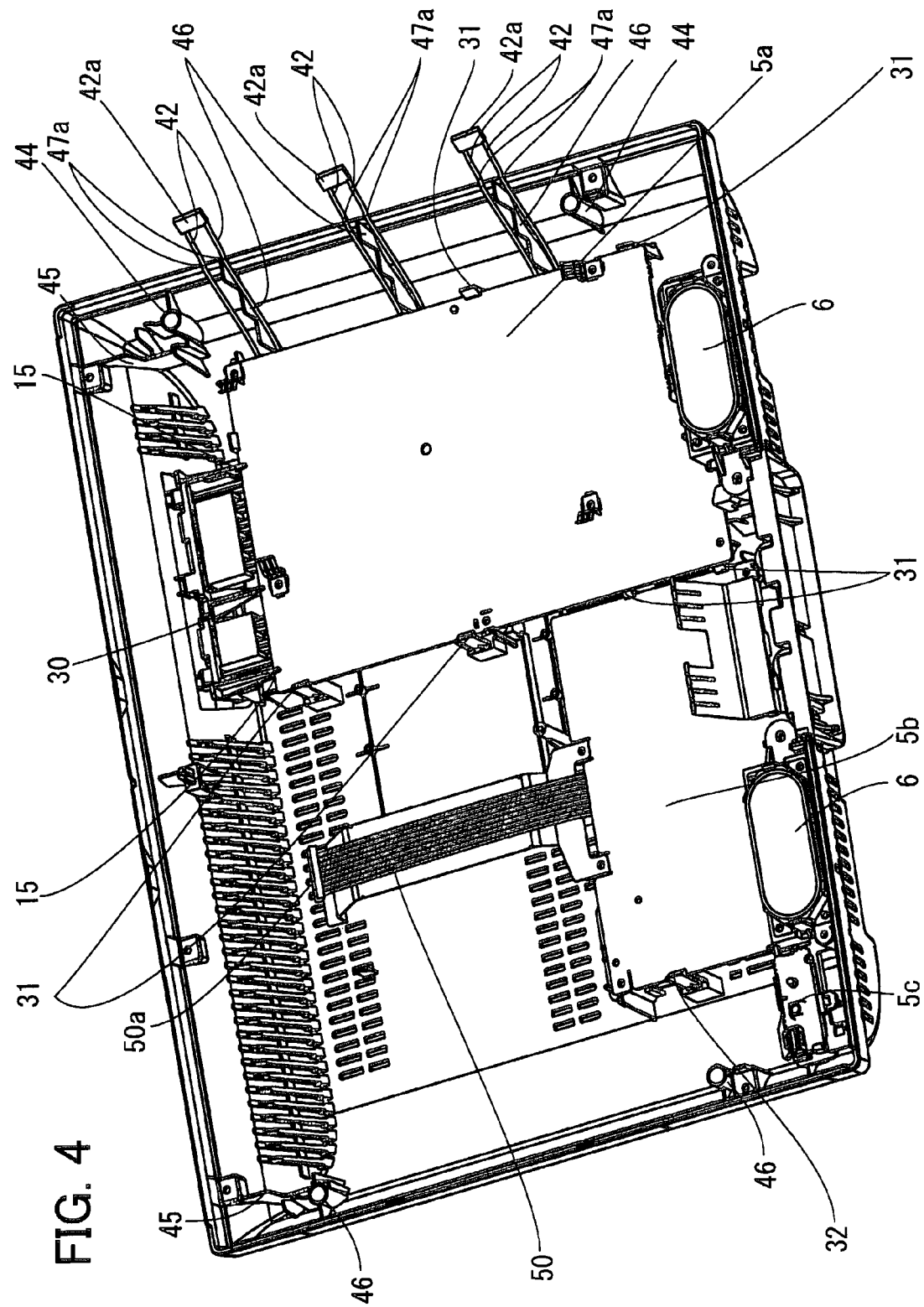
FIG. 4 is a perspective view of the back cabinet having the front cabinet and the display panel removed according to the embodiment of the present invention.
Figure 5:
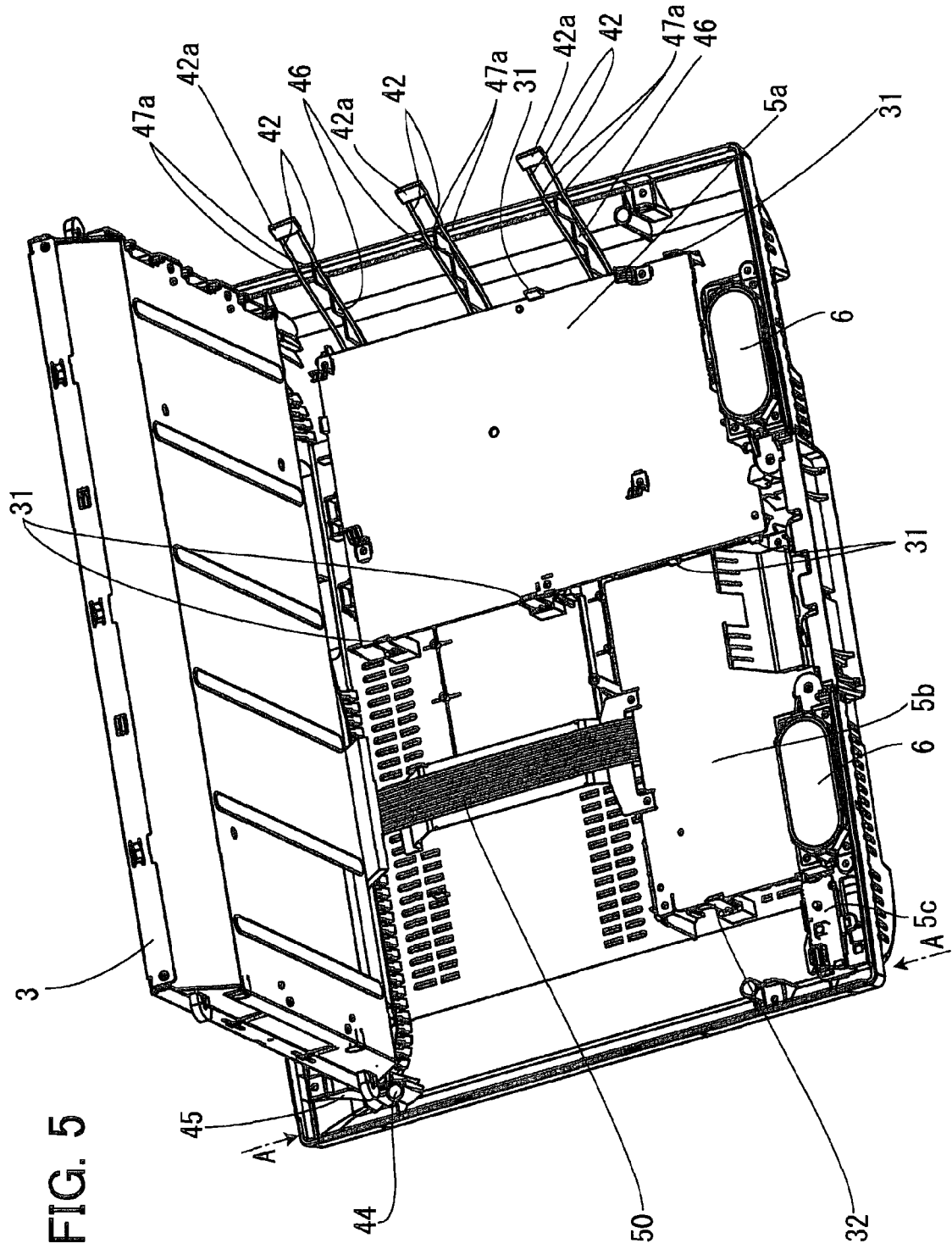
FIG. 5 is a perspective view of the back cabinet shown in FIG. 4 having the display panel mounted on the display panel support rib according to the embodiment of the present invention.
Figure 6:
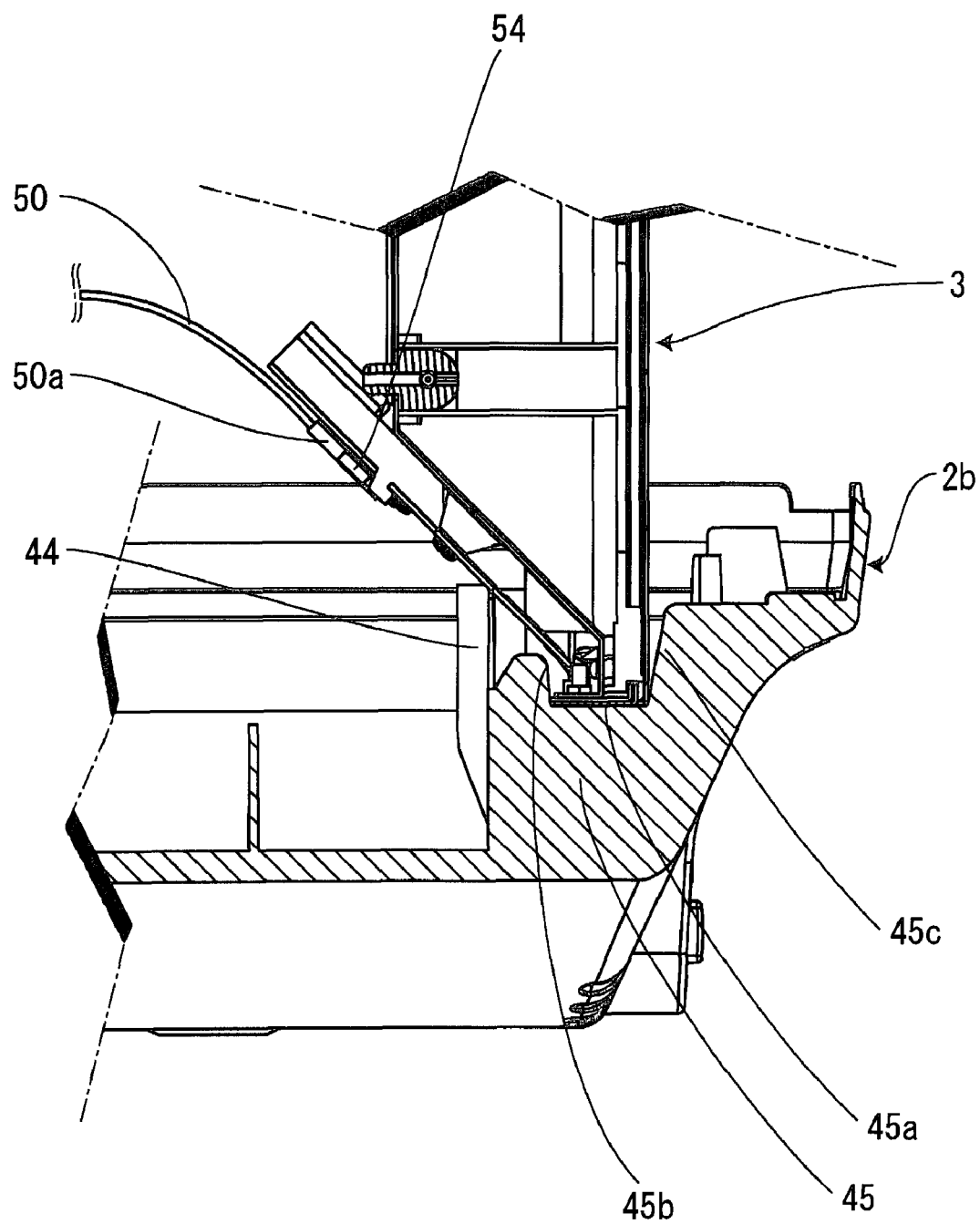
FIG. 6 is an enlarged sectional view partially showing the area around the display panel stand holding portion having the display panel mounted on the display panel support rib as shown in FIG. 5 according to the embodiment of the present invention.

FIGS. 1 to 6 show an embodiment of the present invention. FIG. 1 is a perspective view of a liquid crystal TV receiver as the display device. FIG. 2 is an exploded perspective view of the liquid crystal TV receiver having the front cabinet removed. FIG. 3 is a perspective view as an overview of the back cabinet. FIG. 4 is a perspective view of the back cabinet having the front cabinet and the display panel removed. FIG. 5 is a perspective view of the back cabinet shown in FIG. 4 having the display panel mounted on the display panel support rib. FIG. 6 is an enlarged sectional view partially showing the area around the display panel stand holding portion when the display panel is mounted on the display panel support rib shown in FIG. 5.

FIGS. 1 to 6 show an example of the display device 1 in the form of a flat liquid crystal TV receiver with a small depth dimension. Structures of the display device 1 and the back cabinet will be described referring to FIGS. 1 to 3. A resin casing 2 as the exterior of the display device 1 is structured to be separated into two parts, that is, a front cabinet 2a and a back cabinet 2b. A display panel 3 for displaying the video image, a button unit 4, and inner components such as circuit boards 5a, 5b, 5c, and speakers 6 disposed substantially in parallel with the display panel 3 are to be stored in the back cabinet 2b rather than in the front cabinet 2a. Through holes 7 are formed in the upper surface of the back cabinet 2b. Buttons 8 formed in the button unit 4 are inserted into the through holes 7 so as to project outward in the upper direction. The front cabinet 2a and the back cabinet 2b are assembled while making the respective openings opposite with each other. The casing 2 has the inner portion with the small depth relative to the height and the width.

The circuit boards 5a and 5b assembled in the back cabinet 2b will be described referring to FIG. 4. The power supply circuit board 5a is formed as the circuit of the power supply system for the display device 1. The power supply circuit board 5a is interposed between slits 15 and 30 for fitting the circuit boards formed in the button unit 4 and the fixing unit 20, and plural first circuit board fixing claws 31 formed on the back cabinet 2b are fixed to the edge portion of the power supply circuit board 5a so as to be strongly fixed to the back cabinet 2b. The power supply circuit board 5a includes a pair of connector cables 42 for supplying power to the display panel 3. Each leading end of the pair of the connector cables 42 is provided with a connector 42a.

The main circuit board 5b is formed as the circuit for entirely controlling the display device 1, and includes a video signal transmission cable 50 to be connected to a connector 54 (see FIG. 6) of the display panel 3. A connector 50a is attached to the leading end of the video signal transmission cable 50. A second circuit board fixing claw 32 as the holding member (fixing member) formed on the back cabinet 2b is used to fix the peripheral edge of the main circuit board 5b so as to be strongly fixed to the back cabinet 2b.

The connector cables 42 extending from the power supply circuit board 5a are temporarily fixed after completion of attachment of the power supply circuit board 5a and the main circuit board 5b as the aforementioned circuit boards to the back cabinet 2b. A wire material holding rib 46 is formed on the back cabinet 2b so as not to allow the two connector cables 42 to be adjacently disposed. A temporary holding portion 47a as the notch is formed in the back cabinet 2b for fixing the connector cables 42 provided to both sides of the wire material holding rib 46. Prior to the assembly of the display panel 3, the connector cables 42 are temporarily clamped to the temporary holding portion 47a to be fixed for preventing entrainment of the connector cables 42, resulting in improved workability.

The structure for holding the standing position of the display panel 3 upon connection of the display panel 3 to the aforementioned connector cables 42 will be described referring to FIGS. 5 and 6. The display panel 3 includes a connector 54 corresponding to the connector 50a attached to the leading end of the video signal transmission cable 50. The connector 54 is connected to the connector 50a of the video signal transmission cable 50 to supply the video signal to the display panel. A display panel stand holding portion 45 is formed at the upper end portion inside the back cabinet 2b. The display panel stand holding portion 45 includes a display panel stand mount portion 45a for allowing the display panel 3 to stand thereon, and display panel support members 45b, 45c for supporting the standing position of the display panel 3 mounted on the display panel stand mount portion 45a. A display panel mount portion 44 is integrally formed as the boss for positioning the display panel 3 to be stored in the back cabinet 2b upon assembly of the product to enhance the strength of the display panel stand holding portion 45.

In the above structured display device 1, the display panel 3 mounted on the display panel stand holding portion 45 is interposed between the display panel support members 45b and 45c to have the standing position supported. The electronic parts such as the power supply circuit board 5a, the main circuit board 5b and the speaker 6 are attached to the back cabinet 2b. Connection of those parts, for example, connection of the connector 50a at the leading end of the video signal transmission cable 50 to the connector 54 of the display panel 3 may be easily performed compared with the connection in the generally employed process for manufacturing the liquid crystal display device. No specific equipment is necessary for standing the display panel 3, thus reducing the cost. The display device 1 may be subjected to the performance inspection and the maintenance by holding the standing position of the display panel 3 while keeping connection of the respective wirings, thus improving the workability of the performance inspection and the maintenance. Upon assembly of the display panel 3, the connector cable 42 and the connector 42a are prevented from being caught between the back cabinet 2b and the display panel 3, or fell in the gap between the power supply circuit board 5a and the back cabinet 2b, thus considerably improving the workability at the reduced cost.

The display panel mount portion 44 is formed on the back cabinet 2b adjacent to the display panel stand holding portion 45. The display panel mount portion 44 is used for positioning the display panel 3 so as to be assembled with the back cabinet 2b after completion of the connection of the display panel 3 to the respective circuit boards. This may prevent failure in the assembly of the front cabinet 2a to the predetermined position, or rattling.

Second Embodiment

Figure 7:
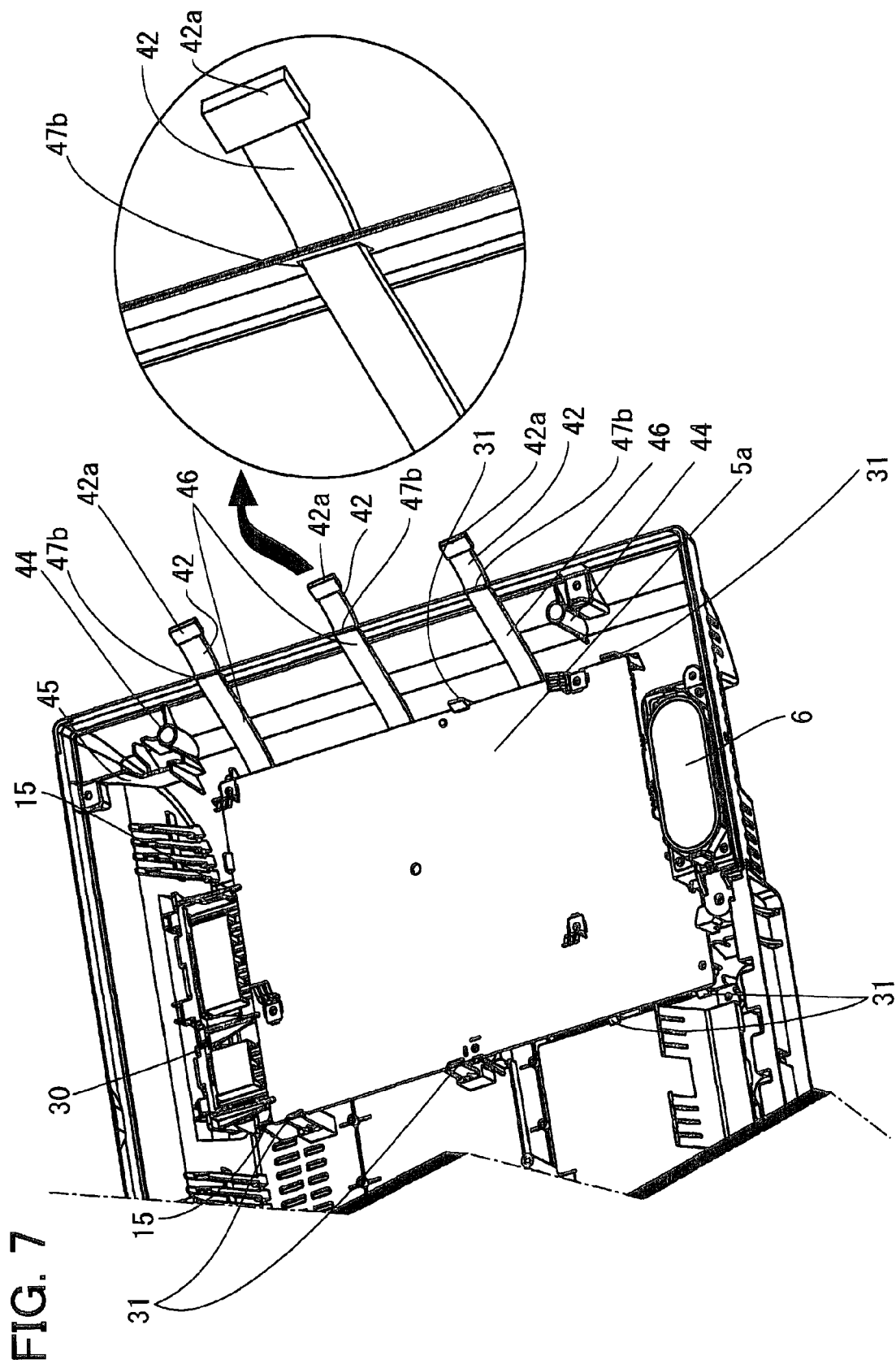
FIG. 7 is a perspective view of the back cabinet having the front cabinet and the display panel removed, partially showing the structure having the through hole as the temporary holding portion formed in the edge portion of the back cabinet according to a second embodiment of the present invention.

FIG. 7 shows a second embodiment of the present invention with respect to the structure having the through hole formed in the edge portion of the back cabinet 2b as the temporary holding portion.

In the second embodiment, the connector cables 42 extending from the power supply circuit board 5a to be connected to the display panel 3 are formed into substantially plain-plate-like flat cables, and the temporary holding portion 47b is formed as the through hole in the edge portion of the back cabinet 2b. Any other structure is substantially the same as that of the back cabinet 2b of the display device 1 according to the first embodiment. The same elements as those of the first embodiment are designated as the same reference numerals, and explanations thereof, thus will be omitted.

When the connector cables 42 are substantially plain-plate-like cables as shown in FIG. 7, it is difficult to temporarily fix the connector cables 42 with the notch-like temporary holding portion 47a as described in the first embodiment. A temporary holding portion 47b as the through hole which is slightly larger than the connector 42a at the leading end of the substantially plain-plate-like connector cables 42 extending from the power supply circuit board 5a is formed in the edge portion of the back cabinet 2b. The connector 42a is inserted into the temporary holding portion 47b after assembly of the power supply circuit board 5a to temporarily hold the connector cables 42. This makes it possible to prevent the connector cables 42 from being positioned under the display panel 3 upon its assembly to the back cabinet 2b.

As has been described with respect to the embodiments, the present invention is not limited to those embodiments but may be modified into various forms without departing from the scope of the present invention. For example, the display panel of the display device 1 may be of any type without being limited to the display panel 3 so long as it is the flat display panel (for example, plasma display and organic EL). The display panel stand holding portion 45 may be formed in any portion of the back cabinet 2b without being limited to the upper end portion, for example, the left or right side, or the lower side. In this case, preferably the weight components such as the power supply circuit board 5a, the main circuit board 5b, and the speaker 6 are positioned and mounted opposite the display panel stand holding portion 45 to prevent the display panel 3 and the back cabinet 2b from falling by the load applied to the display panel 3 which is kept standing. As a result, the load is dispersed into the upper and the lower portions of the back cabinet 2b to keep the balance, thus keeping the display panel 3 and the back cabinet 2b from falling.

What is claimed is:

1. A display device comprising:
   a casing;
   a display panel provided inside the casing, wherein
   the casing is formed by assembling a front cabinet having an opening with a rectangular-shaped back cabinet having an opening through engagement of the front and back cabinet openings, wherein
   the back cabinet comprises a pair of display panel support ribs having support members vertically supporting the display panel in one of a long side direction and a short side direction, and
   the display panel support rib includes a support member vertically supporting the display panel when the back cabinet is laid on its back surface wherein the display panel is generally perpendicular to the back cabinet when the back cabinet is laid on its back surface.

2. The display device according to claim 1, wherein a mount portion of the display device perpendicularly extending from the back cabinet is formed adjacent to the display panel support rib.

3. The display device according to claim 1, wherein an inner component is disposed at a position opposite the display panel support rib with respect to a center of the back cabinet.

4. The display device according to claim 3, wherein the inner component includes at least a circuit board.

5. The display device according to claim 3, wherein the display panel support rib is disposed at an upper end portion of the back cabinet and the inner component is disposed at a lower portion of the back cabinet in a concentrated manner.

6. The display device according to claim 4, wherein the circuit board includes a connector portion to be connected to the display panel, and a temporary holding portion for temporarily holding the connector portion is formed in an edge portion of the back cabinet.

7. The display device according to claim 6, wherein the connector portion is a connector with a wire material extending from the circuit board, and the temporary holding portion is a notch which allows a portion of the wire material of the connector to be fixed.

8. The display device according to claim 6, wherein the connector portion is a generally flat cable member extending from the circuit board, and the temporary holding portion is a through hole which allows insertion of the cable member.

* * * * *